United States Patent
Kelkar et al.

(10) Patent No.: US 8,719,344 B2
(45) Date of Patent: May 6, 2014

(54) FLEXIBLE ADDRESS PROVISIONING ACROSS SUBNETS AND VRFS

(75) Inventors: Mahesh Kelkar, Nashua, NH (US); Prasad Deshpande, Lexington, MA (US); Del Friedman, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 45 days.

(21) Appl. No.: 13/401,799

(22) Filed: Feb. 21, 2012

(65) Prior Publication Data

US 2013/0159409 A1  Jun. 20, 2013

Related U.S. Application Data

(60) Provisional application No. 61/578,185, filed on Dec. 20, 2011.

(51) Int. Cl.
*G06F 15/16* (2006.01)

(52) U.S. Cl.
USPC .................. 709/204; 709/203; 709/205

(58) Field of Classification Search
USPC ......... 709/203, 212, 217–222, 227, 228, 230, 709/232, 237, 238; 370/351, 389, 392, 370/395.1, 395.2, 395.3, 395.31, 398, 399, 370/422, 431, 432
See application file for complete search history.

(56) References Cited

U.S. PATENT DOCUMENTS

| | | | |
|---|---|---|---|
| 7,181,542 B2 | 2/2007 | Tuomenoksa et al. | |
| 7,340,519 B1 * | 3/2008 | Golan et al. | 709/225 |
| 7,558,844 B1 * | 7/2009 | Heidelberger et al. | 709/220 |
| 7,640,287 B1 * | 12/2009 | Gai et al. | 709/200 |
| 7,640,340 B1 * | 12/2009 | Stapp et al. | 709/224 |
| 7,808,891 B2 * | 10/2010 | Law | 370/217 |
| 7,944,938 B2 * | 5/2011 | Deshpande | 370/432 |
| 2002/0013844 A1 * | 1/2002 | Garrett et al. | 709/225 |
| 2002/0023174 A1 * | 2/2002 | Garrett et al. | 709/245 |
| 2004/0153556 A1 * | 8/2004 | Claes et al. | 709/229 |
| 2005/0286518 A1 * | 12/2005 | Park et al. | 370/389 |
| 2007/0036178 A1 * | 2/2007 | Hares et al. | 370/490 |
| 2007/0214270 A1 * | 9/2007 | Absillis | 709/227 |
| 2007/0220252 A1 | 9/2007 | Sinko | |
| 2007/0297378 A1 | 12/2007 | Poyhonen et al. | |
| 2008/0028071 A1 * | 1/2008 | Miyajima | 709/224 |
| 2008/0259941 A1 * | 10/2008 | Zhao et al. | 370/401 |
| 2009/0006635 A1 * | 1/2009 | Siegmund | 709/228 |
| 2009/0089431 A1 | 4/2009 | Kim et al. | |
| 2009/0129386 A1 * | 5/2009 | Rune | 370/392 |
| 2009/0210518 A1 * | 8/2009 | Verma et al. | 709/220 |
| 2010/0223363 A1 | 9/2010 | Sarikaya et al. | |
| 2010/0284305 A1 * | 11/2010 | Papp et al. | 370/254 |

* cited by examiner

*Primary Examiner* — Hassan Kizou
*Assistant Examiner* — Phyllis Book
(74) *Attorney, Agent, or Firm* — Baker Botts L.L.P.

(57) ABSTRACT

A method and device to manage addresses in a network includes receiving a request for a network address from a client computer at a proxy computer, relaying the request to an address server, receiving an address offer message from the address server at the proxy computer, storing an server identifier of the address server from the offer message, replacing the server identifier of the address server in the offer message with an address identifier of the proxy computer to produce an altered offer message, and sending the altered offer message to the client computer.

14 Claims, 5 Drawing Sheets

FLEXIBLE ADDRESS PROVISIONING ACROSS SUBNETS AND VRFS

RELATED APPLICATIONS

This application claims the benefit, under 35 U.S.C. §119 (e), of U.S. Provisional Patent Application Ser. No. 61/578,185, filed Dec. 20, 2011, which is incorporated herein by reference.

BACKGROUND

Client devices that require Internet Protocol (IP) addresses typically use an addressing protocol such as Dynamic Host Configuration Protocol (DHCP). When a client first enters a network, it sends a broadcast request for an address; this request is referred to as a DISCOVER message. The router sends the DISCOVER message to a DHCP server, which responds with an OFFER message that includes an address. The client sends a REQUEST to inform the server that the client intends to use the address. The server then sends an acknowledgement ACK message confirming that the client has that address for a specified period of time. Typically, all of these messages are broadcast messages, except possibly for the last one. Once the address is assigned, messages between the client and the DHCP server that may include requests to renew the lease on the address, etc., are unicast between the client and the server.

When a client enters a subnet of the network that does not have a DHCP server, a device on the subnet will typically have the capability to route the request to a different subnet upon which the DHCP server resides. The router that routes the request to a different subnet may be referred to as a DHCP relay or proxy agent. The proxy agent will generally impersonate the DHCP server to the client and the client to the DHCP server.

When using Virtual Routing and Forwarding (VRF) tables, issues may arise with the use of proxies. VRFs allow multiple instances of routing tables to exist in the same routing device and may be used to differentiate different sets of addresses, such as those associated with a particular customer on a wholesale network, or to allow management of portions of a network.

DHCP servers identify themselves to DHCP client via the DHCP server identifier option, which specifies the IP or other network address used by the server. In a typical proxy situation, the IP or other network address is used as the server identifier on the access interface on the router. This may require a proxy ARP (address resolution protocol) for resolving the address if the address assigned to a client or subscriber is not on the same subnet as the server identifier subnet. For VRFs, if the access interface resides in a different VRF than the subscriber interface, the IP address of the access interface would not be available in the VRF of the subscriber interface and therefore cannot be used as the server identifier. This may require separate access interfaces to be configured for each VRF, or all of the subscriber interfaces, access interfaces and server interface to be on the same VRF.

DETAILED DESCRIPTION OF THE EXAMPLE EMBODIMENTS

Figure 1:
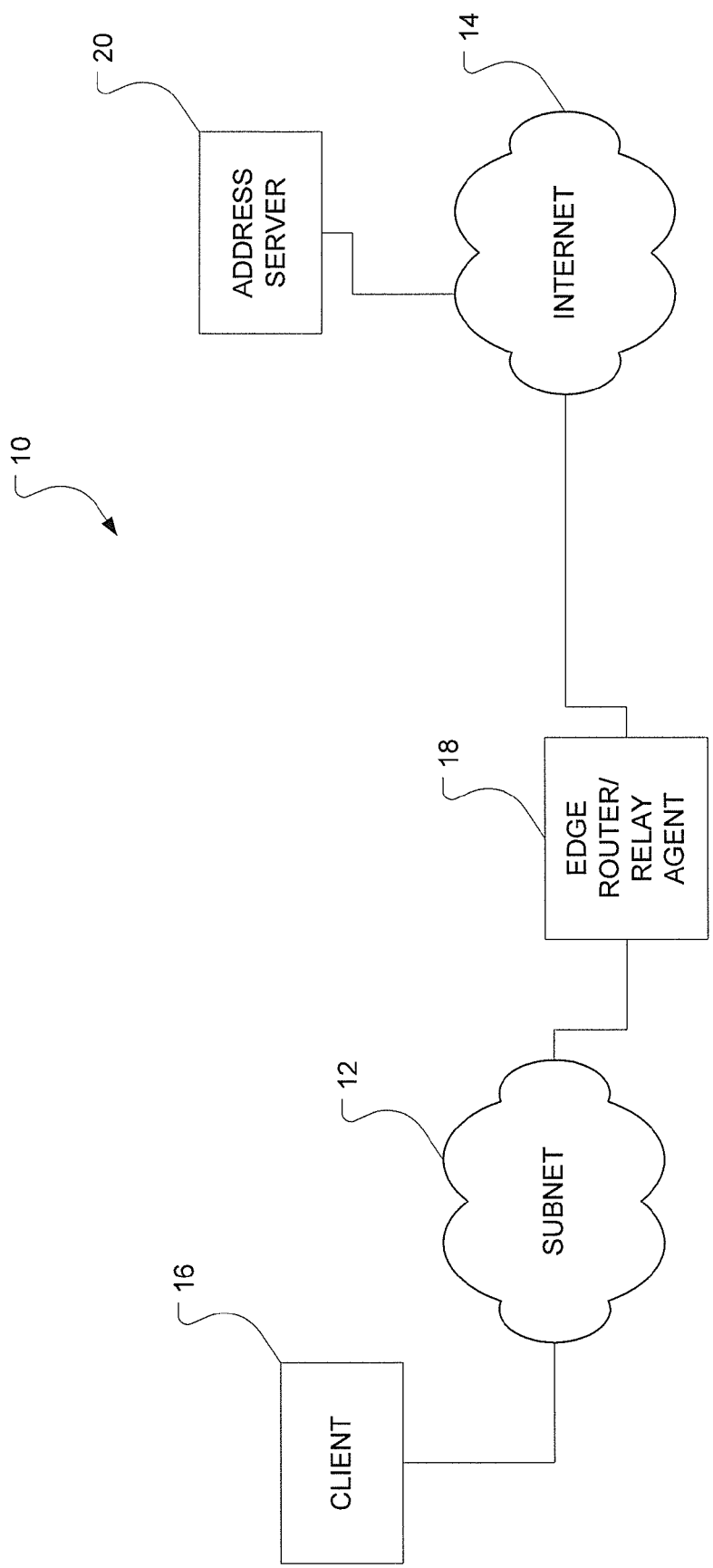
FIG. 1 shows a network diagram of a client device and an address server in different subnets.

FIG. 1 shows a diagram of a network 10. Within the network there exist more than one subnet such as 12 and 14. The client device 16, which for this discussion consists of any device requesting an address, resides on a first subnet 12. The first subnet 12 has a router or other traffic management device 18 that has routing tables and information for subnets beyond the current subnet 12. This discussion may refer to this device as an "edge" router, although the device may actually consist of other types of network devices. The discussion refers to it as an edge router, because it resides on the "edge" of the Internet or other network.

The particular embodiments discussed here have the address server 20 that resides on a different subnet 14 than the device 16 that requests the address. This causes problems because in the address request process initiated by the client 16 the broadcast messages will not reach beyond the subnet 12 without the edge router 18. The edge router 18 can forward the broadcast message to the address server 20. It is possible to provide the edge router 18 with additional capabilities to assist the provider and the customers to better manage the network.

In the embodiment of DHCP (Dynamic Host Configuration Protocol), the "server identifier" field is used both to identify a DHCP server in a DHCP message and a next hop address from clients to servers. The server chooses an address as the server identifier that, to the best of the server's knowledge, is reachable from the client. For example, if the DHCP server and the DHCP client are connected to the same subnet, the server would select the IP address the server is using for communication on that subnet as the server identifier. If the server has received a message through a DHCP relay agent, the server would choose an address from the interface on which the message was received as the server identifier, unless the server has other, better information on which to make its choice. DHCP clients use the IP address provided in the server identifier option for any unicast requests to the DHCP server.

The above configuration works fine with some limitations. In the router providing the proxy/relay service, proxy ARP (Address Resolution Protocol) must be configured to allow ARP to respond to an ARP request from a client specifying an IP address that is not resident on the client subnet. This allows the proxy router to respond to an ARP request specifying the address from the server identifier.

Figure 2:
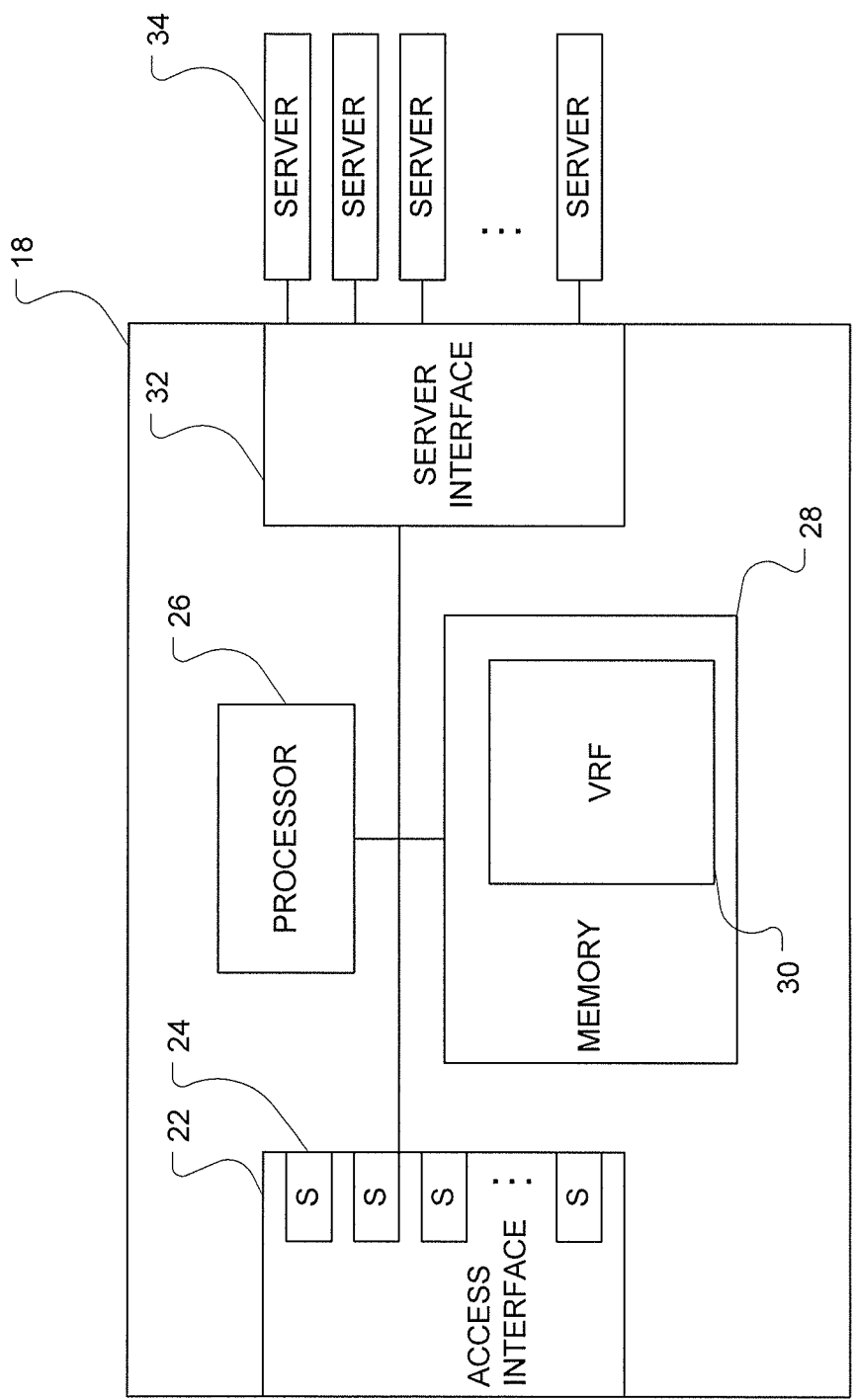
FIG. 2 shows an example of a routing device using proxy addressing.

More critically, the subscriber interface must reside in the same VRF as the access interface and server-facing interface, since ARP will not respond to an ARP request from the subscriber with an address in a different VRF. This severely restricts the functionality of the router. FIG. 2 shows an example of this situation.

In FIG. 2, the proxy device 18 has an access interface 22. This discussion may also refer to it as the "parent" interface, as it is the interface upon which all of the child subscriber/client interfaces reside. The address control traffic, such as the DHCP control traffic, and the customer data traffic travels through this interface. This interface 22 may support many subscriber interfaces such as 24.

The subscriber interfaces (S) such as 24 handle all receptions and transmissions for the subscriber. The address protocol creates them dynamically using the address signaling such as DHCP. Multiple subscriber interfaces may all use the same access interface to gain access to the switching or routing device. The processor or processors such as 26 reside in the device and process and route all of the traffic across the access interface 22, including however many child subscriber interfaces reside on the access interface 22, using the routing table 30 stored in the memory 28. In this example, the subscriber interfaces 24 and the access interfaces 22 must reside in the same VRF.

In addition, the server interface 32 and the interfaces with the individual servers such as 34 must also reside in the same VRF as the access interface 22 and all the subscriber interfaces 24. This reduces the functionality of the VRF as no way exists to group or separate the subscribers, the servers, and the respective traffic for all of them.

The embodiments here allow the access interface, subscriber interface, and server-facing interface to reside in different VRFs. This is essential for customer configuration flexibility. For example, this allows a single access interface in one VRF to support multiple subscribers across a range of different VRFs.

Figure 3:
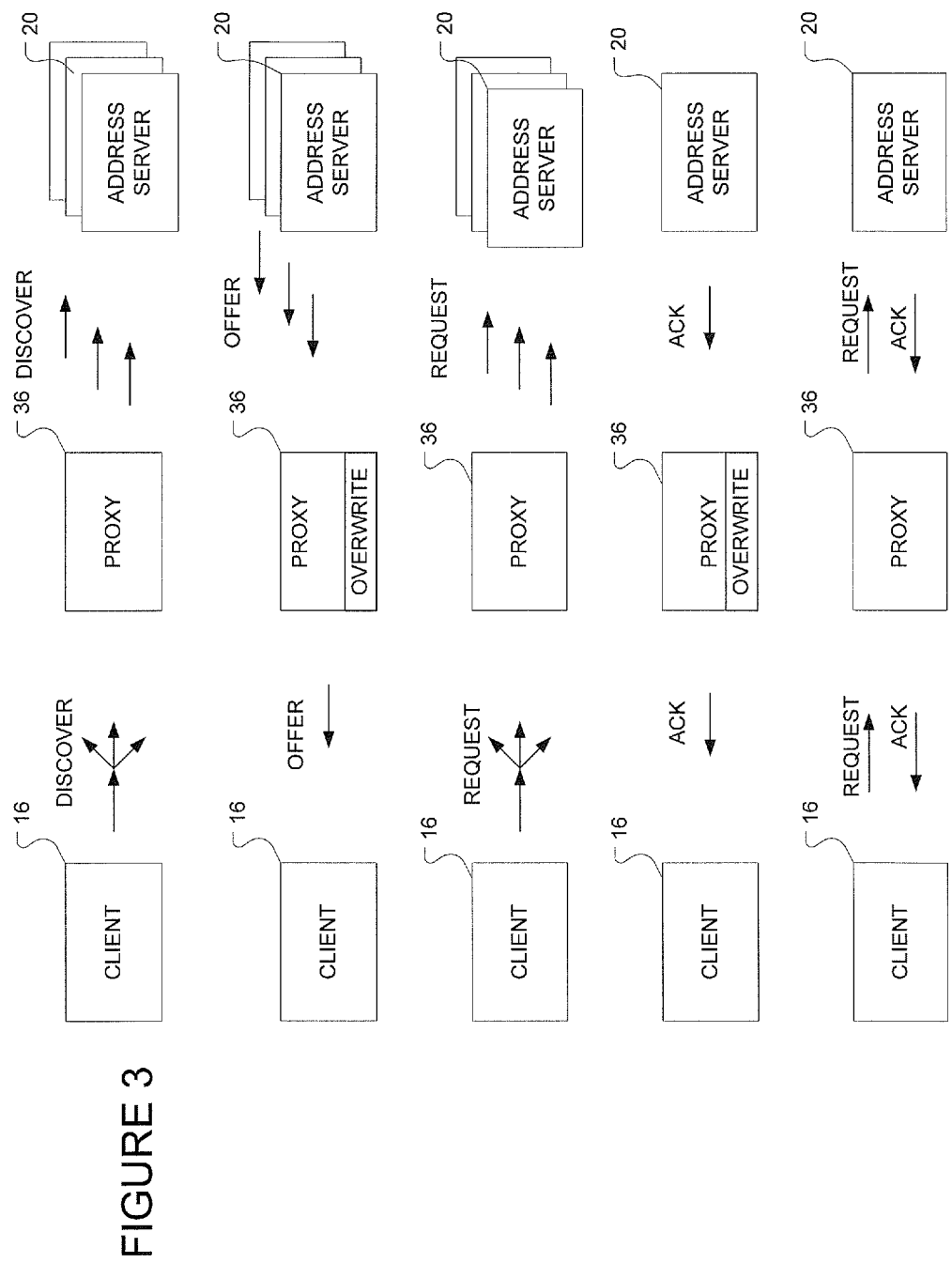
FIG. 3 shows a message diagram of an address proxy process employing server identifier overwriting.
Figure 4:
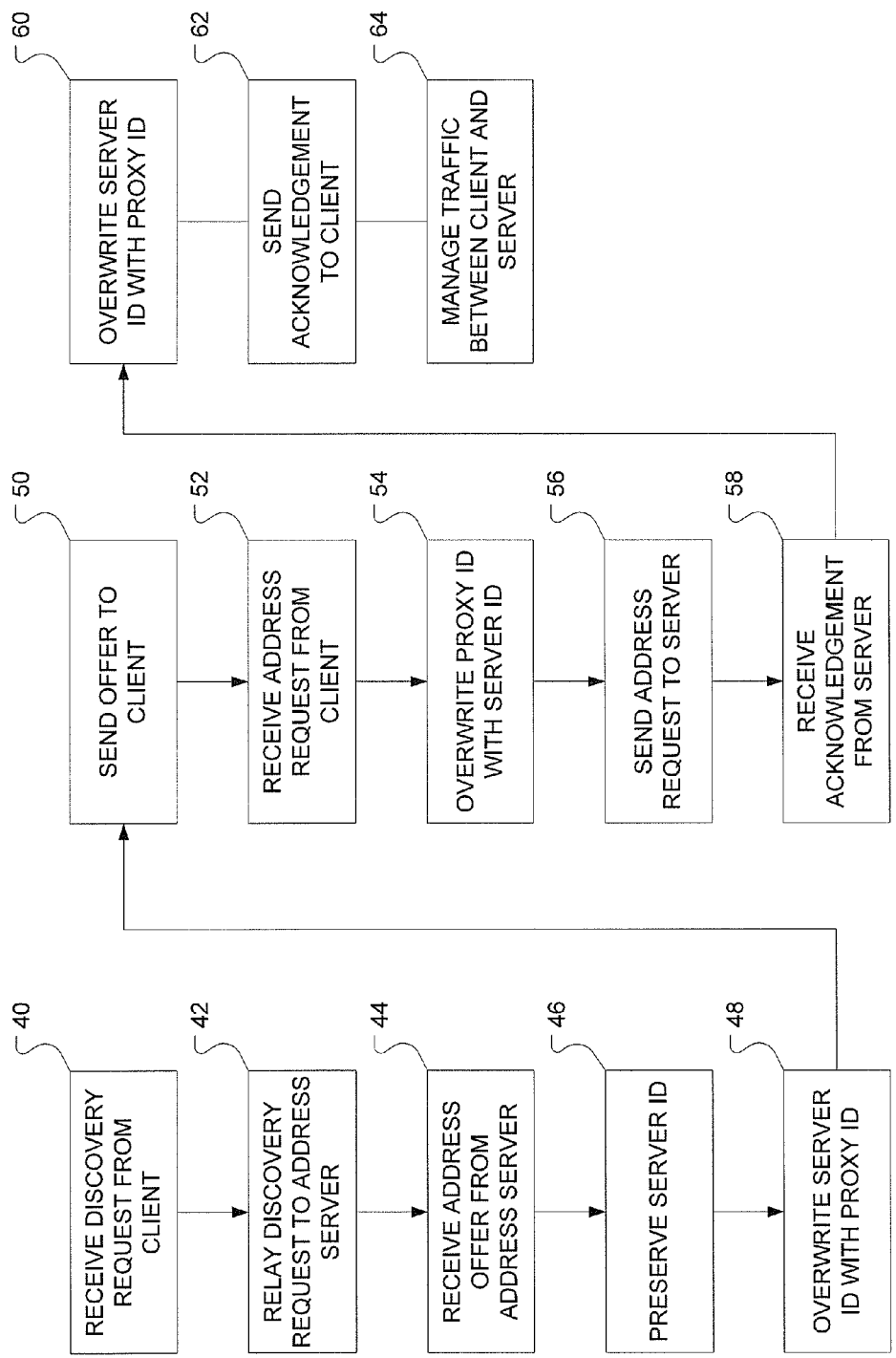
FIG. 4 shows a flowchart of an embodiment of an address proxy process employing server identifier overwriting.

In FIG. 3, the client sends out its broadcast DISCOVER request asking for an address. FIG. 4 shows an accompanying flow chart, from the perspective of the proxy device. The proxy device 36 may consist of the edge router device previously mentioned. The proxy device may also consist of a processing device such as in a computing device, the processor of which executes software instructions retrieved from memory in the same device. The software instructions may exist on an article of tangible computer readable media.

The proxy device receives the request from the client at 40 in FIG. 4. The proxy device relays the request to the to the address server at 42, as shown in the first transaction of FIG. 3. In the second transaction of FIG. 3, the address offer message is received at the proxy device from the server, shown in the flowchart as 44. Before the proxy device sends the OFFER message to the client device, it stores the server identifier of the address server, shown at 46 in FIG. 4 and then overwrites the server identifier with the proxy device's own address identifier in its place at 48. In the embodiments here, the proxy device chooses a server identifier to be resident on the same VRF and subnet as the client/subscriber device. The proxy device then sends the OFFER message to the client device in FIG. 3.

The client device identifies the proxy device as the address server and will continue to use that address identifier for both the broadcast portion of the transactions and the unicast portions. The client device then broadcasts a REQUEST message to the proxy device identifying the proxy device as the server. This occurs at 50 in FIG. 4, the third transaction in FIG. 3. The proxy device overwrites its address identifier in the message from the client with the server identifier, already preserved at 46, at 54 in FIG. 4. It then transmits the REQUEST message to the address server at 56, completing the third transaction in FIG. 3.

The address server sends the ACKNOWLEDGEMENT (ACK) message, which is received by the proxy device at 58 in FIG. 4, the beginning of the fourth transaction in FIG. 3. The proxy device overwrites the server identifier with its own address identifier at 60 in FIG. 4, and then sends the ACK message to the client at 62, completing the broadcast address process.

As mentioned above, the proxy device may involve re-tasking of a device already in the system, with the proxy device capability being added by way of updating software instructions operating in the proxy device. The methods discussed here may be embodied in a tangible piece of computer-readable media storing those instructions and loaded into an existing device to allow the existing device to gain this capability.

The proxy device 30 may take several forms, but with the embodiments described here, the device can support multiple VRFs within the same device. By allowing the proxy device to overwrite the server identifier, rather than having to simply forward the server identifier provided by the server according to the rules discussed above, the proxy device can select a server identifier that resides on the same VRF and subnet as the client device, even if the proxy device resides on a different subnet. When the client device sends an ARP message to the server identifier that was provided, it matches the subnet of the client device, allowing the ARP message to be processed accordingly.

Figure 5:
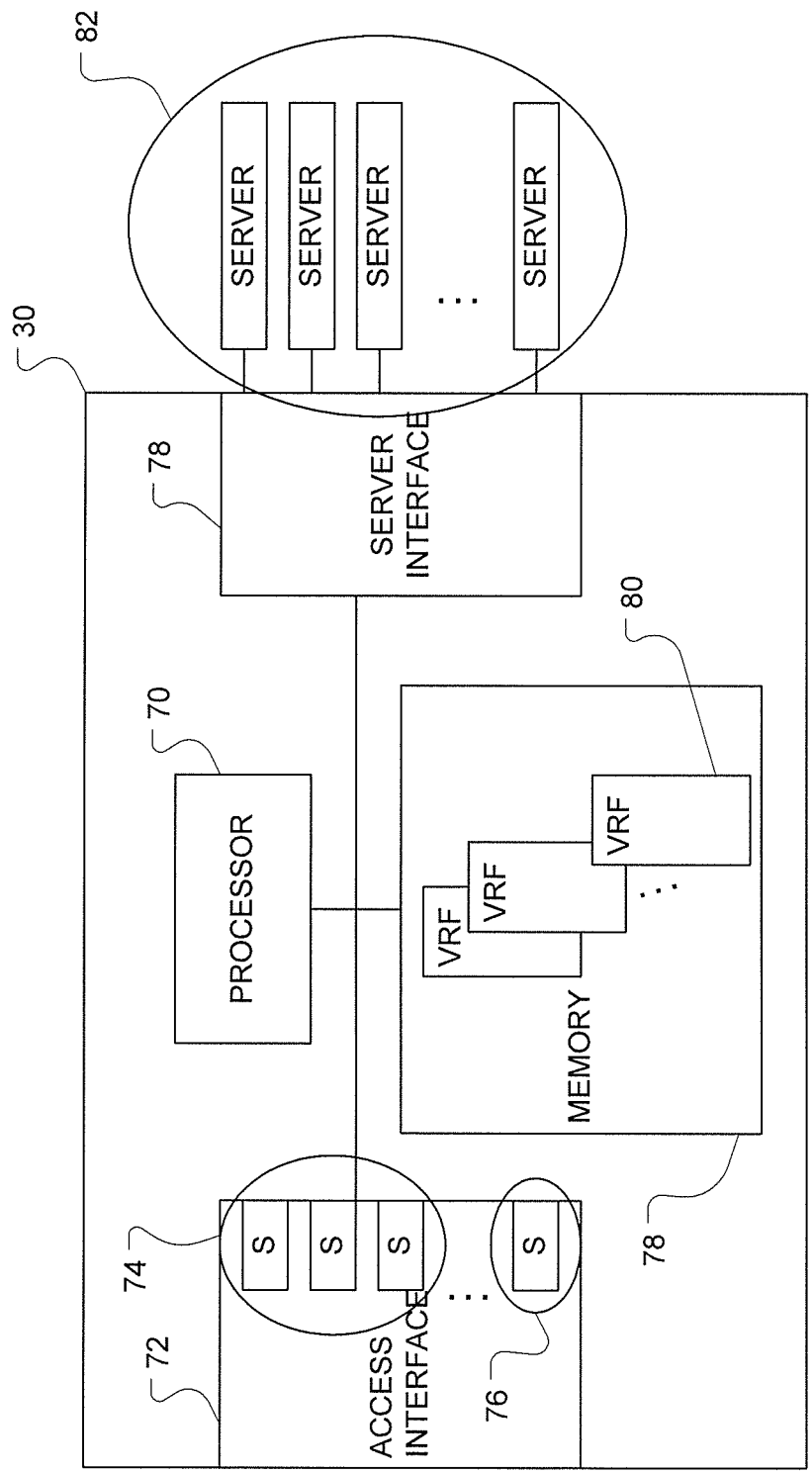
FIG. 5 shows a block diagram of an address proxy device using server identifier overwriting.

FIG. 5 shows an embodiment of the proxy device 30 employing server overwriting. The access interface 72 supports multiple subscriber interfaces. However, in contrast with the device of FIG. 2, the subscriber interfaces can reside in different VRFs, allowing the customers to group their subscribers into management groups. For example, the subscriber interfaces (S) in the group 74 may all belong to a particular customer, while the subscriber interface such as 76 may reside in a different VRF. The server interface 78 may also support several individual server interfaces, which can now be grouped into their own server VRF such as 82. This may allow the servers to reside on their own VRF, with no customer traffic. The device has a processor 70 that routes traffic and manages the multiple VRFs such as 80 as identified in the memory 78.

The discussion here has focused on general embodiments and implementations. Specifically, an IP subscriber interface is created on the router or network device to identify, monitor and manage the traffic for the subscriber. The IP subscriber interface is created on a configured VRF (virtual routing and forwarding) with a configured unnumbered loopback interface. This guarantees that the IP subscriber interface and the loopback interface are guaranteed to be in the same VRF. In the DHCP protocol exchange, the server identifier of DHCP OFFER and ACK packets towards the subscriber are overwritten by the proxy device, in this embodiment a DHCP proxy device. The server identifier is overwritten with the IP address of a local interface with a VRF and subnet matches that of the IP address assigned to the subscriber. This matching local address will typically be the address assigned to the loopback interface associated with the IP subscriber interface. The matching address will be selected in the VRF of the IP subscriber interface.

If no matching address can be found, the OFFER will be dropped. This guarantees that the DHCP proxy will respond properly to subscriber ARPs (Address Resolution Protocol) for the server identifier received on the subscriber interface. It is important to note that DHCP proxy ensures that DHCP server assigned IP address belongs to subnet of at least one local IP address associated with the IP subscriber interface.

This approach has advantages in the DHCP/IP embodiments. The server identifier is in the same subnet as the IP address assigned to the subscriber. As a result, downstream devices do not need to do anything specific to handle the fact that the subscriber is in a VRF. ARP resolution works within the security framework in that subscribers cannot ping or interact with other IP addresses in the box, such as accessing interface IP addresses or other subscriber's IP addresses. Multiple subscribers belonging to different VRFs can co-exist on the same access interface because of the way the server identifier is modified. The different VRFs may allow grouping of subscriber interfaces according to some characteristic of the subscriber, such as a customer to whom they belong, or some subgroup within a customer's users, etc.

One should note that the embodiments discussed above address the DHCP constructs and protocols. No limitations to this particular protocol are intended nor should they be implied. The general concepts and protocols could apply to other protocols and addressing structures, presently in existence or future implementations.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of managing addresses in a network, comprising:
   receiving a request for a network address from a client computer at a proxy computer;
   relaying the request to an address server;
   receiving an address offer message from the address server at the proxy computer;
   storing a server identifier of the address server from the offer message;
   replacing the server identifier of the address server in the offer message with an address identifier of the proxy computer to produce an altered offer message;
   sending the altered offer message to the client computer;
   wherein the proxy computer creates a subscriber interface for the client computer, and
   wherein the subscriber interface is created in a configured virtual routing and forwarding partition such that the subscriber interface and an IP loopback interface are in the same virtual routing and forwarding partition.

2. The method of claim 1, further comprising:
   receiving a request message from the client computer at the proxy computer;
   replacing the address identifier of the proxy computer with the server identifier of the address server in the message; and
   transmitting the request message to the address server.

3. The method of claim 2, further comprising:
   receiving an acknowledgement message from the address server;
   replacing the server identifier of the address server with the address identifier of the proxy server in the acknowledgement message; and
   transmitting the acknowledgement message to the client computer.

4. The method of claim 1, further comprising transmitting a message to an edge network device notifying the edge network device of the request and receiving control information from the edge network device.

5. A network device, comprising:
   an access interface to allow the device to communicate with subscriber interfaces;
   at least one server interface to allow the device to communicate with servers, including at least an address server;
   a memory configured to store multiple instances of a configured virtual routing and forwarding partition; and
   a processor configured to:
     receive messages from the address server intended for a subscriber interface;
     overwrite the server identifier of the address server with an address identifier of the network device;
     send the message through the subscriber interface; and
   wherein the processor is further configured to create at least one of the subscriber interfaces in a particular one of the configured virtual routing and forwarding partitions, such that the created subscriber interface and an IP loopback interface are in the same virtual routing and forwarding partition.

6. The network device of claim 5, wherein the process overwrites the server identifier with an address identifier of the network device that resides on a same VRF and subnet as the subscriber interface.

7. The network device of claim 5, wherein the subscriber interfaces are separated into virtual routing and forwarding routing partitions according to a characteristic of the subscriber interface.

8. The network device of claim 5, wherein the server interfaces reside in their own virtual routing and forwarding partitions.

9. An article of non-transitory, computer-readable media containing instructions that when executed by a processor in a network device, cause the device to:
   receive a request for a network address from a client computer at a proxy computer;
   relay the request to an address server;
   receive an address offer message from the address server at the proxy computer;
   store a server identifier of the address server from the offer message;
   replace the server identifier of the address server in the offer message with an address identifier of the proxy computer to produce an altered offer message;
   send the altered offer message to the client computer; and
   create, by the proxy computer, a subscriber interface for the client computer, the subscriber interface created in a configured virtual routing and forwarding partition such that the subscriber interface and an IP loopback interface are in the same virtual routing and forwarding partition.

10. The article of claim 9, wherein the instructions further cause the device to:
    receive a request message from the client computer at the proxy computer;
    replace the address identifier of the proxy computer with the server identifier of the address server in the message; and
    transmit the request message to the address server.

11. The article of claim 9, wherein the instructions further cause the device to:
    receive an acknowledgement message from the address server;
    replace the server identifier of the address server with the address identifier of the proxy server in the acknowledgement message; and
    transmit the acknowledgement message to the client computer.

12. The article of claim 9, wherein the instructions further cause the device to transmit a message to an edge network device notifying the edge network device of the request and receive control information from the edge network device.

13. The article of claim 9, wherein the instructions further cause the device to create a subscriber interface for the client computer.

14. A network device, comprising:
    a means for allowing the device to communicate with subscriber interfaces;

at least one means to allow the device to communicate with servers, including at least an address server;

a means for storing multiple instances of a configured virtual routing and forwarding partitions; and a processing means for:
  receiving messages from the address server intended for a subscriber interface;
  overwriting the server identifier of the address server with an address identifier of the network device;
  sending the message through the subscriber interface; and
  wherein the processor is further configured to create at least one of the subscriber interfaces in a particular one of the configured virtual routing and forwarding partitions, such that the created subscriber interface and an IP loopback interface are in the same virtual routing and forwarding partition.

* * * * *